United States Patent [19]

Vives et al.

[11] 4,377,660

[45] Mar. 22, 1983

[54] MOLDED POLYMER TREATMENT

[75] Inventors: Van C. Vives; Donnie G. Brady, both of Bartlesville, Okla.

[73] Assignee: Phillips Petroleum Company, Bartlesville, Okla.

[21] Appl. No.: 310,716

[22] Filed: Oct. 13, 1981

[51] Int. Cl.$^3$ .............................................. C08K 3/40
[52] U.S. Cl. .................................... 524/494; 264/232; 264/331.11; 264/340; 524/609; 525/537
[58] Field of Search .............. 525/537; 264/232, 340, 264/331.11; 260/37 R; 524/494, 609

[56] References Cited

U.S. PATENT DOCUMENTS

| | | | |
|---|---|---|---|
| 3,562,199 | 2/1971 | Hill et al. | 260/37 |
| 3,717,620 | 2/1973 | Rohlfing | 260/79 |
| 3,948,865 | 4/1976 | Brady et al. | 260/79 |
| 4,251,575 | 2/1981 | Brady et al. | 528/388 |

*Primary Examiner*—Melvyn I. Marquis

[57] ABSTRACT

The physical and chemical properties of arylene sulfide polymer articles are improved by contacting with a strong oxidizing agent followed by a step-wise heat treatment at temperatures below the melting point of the polymer.

9 Claims, No Drawings

MOLDED POLYMER TREATMENT

This invention relates to the treatment of polymers to improve the physical properties and to extend the limits of usage of the polymer to higher temperatures. In another aspect, this invention relates to a process for treating shaped polymers, with a strong oxidizing agent, followed by step-wise heat treatment of the polymer. In a further aspect, this invention relates to the treatment of molded arylene sulfide polymers by contacting with a strong oxidizing agent, such as sodium hypohalite, followed by a step-wise heat treatment at increased temperatures to improve the mechanical properties and extend the limits of usage to higher temperatures for the polymer.

It is well-known in the art that some solid materials, such as thermoplastics, which are capable of attaining some degree of crystallinity will, upon annealing, exhibit some increase in strength. It is currently theorized that such increased strength is a result of an increased degree of crystallinity resulting from the annealing process. Significant improvements in strength in amorphous polymers have not been observed by subjecting these thermoplastic materials substantially devoid of any measurable crystallinity in normal annealing or heat treatment processes.

Aromatic sulfide and arylene sulfide polymers are well known in the art to be thermoplastic in nature and are useful in such areas as electrical components, wire coatings, automotive parts, etc.

To extend the value of poly(arylene sulfide) resins and the utility of the products prepared therefrom, still further improvements have been sought with regard to treatment of molded articles formed therefrom to further improve the properties of the formed products to meet the requirements of certain applications.

Accordingly, an object of this invention is to provide a process for improving the properties of arylene sulfide polymers.

A further object of this invention is to provide shaped solid polymers of aromatic compounds having improved physical properties.

It is a further object of this invention to provide a process of heat treating shaped solid polymers without causing extreme chemical changes leading to a much different polymer.

Still another object of this invention is to provide shaped solid polymers having improved structural characteristics in a simple, economic and expedient way.

Another object of this invention is to produce molded polymers having desirable physical properties.

Other aspects, objects, and the several advantages of this invention are apparent from a study of the disclosure and the appended claims.

This invention pertains to improving the mechanical and chemical properties of arylene sulfide resins which are at least partially cured by contacting molded objects thereof with at least one strong oxidizing agent followed by heat treating the molded article in a step-wise fashion.

Further, according to the invention, there is provided a process of improving the physical and chemical properties of shaped solid arylene sulfide polymers comprising contacting the surface of a molded arylene sulfide polymer with a strong oxidizing agent, such as sodium hypohalite, and heat treating the thus-treated polymer in a step-wise fashion at increased temperatures which are below the melting point of the polymer.

More specifically, in accordance with the invention, a process is provided for oxidizing and heat treating arylene sulfide polymers formed into molded objects by contacting the surface of a molded object formed from an arylene sulfide polymer with an oxidizing agent, such as an alkali metal or alkaline earth metal hypohalite, followed by step-wise heat treatment of the polymer at temperatures ranging from about 475° F. to about 550° F. to improve the chemical and mechanical properties of the polymer.

The term "arylene sulfide polymer" as used in this specification is intended to include polymers of the type which are prepared as described in U.S. Pat. No. 3,354,129; issued Nov. 21, 1967, to Edmonds and Hill. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in this invention, because of their high thermal stability and availability of the materials from which they are prepared, are those polymers having the repeating unit —R-S— where R is phenylene, biphenylene, naphthalene biphenylene ether or a lower alkyl-substituted derivative thereof. By "lower alkyl" is meant alkyl groups having one to six carbon atoms such as methyl, propyl, isobutyl, n-hexyl, and the like. The preparation of such polymers is quite well disclosed in the above patent of Edmonds et al.

The polymers of this invention are preferably those which have melting temperatures above about 200° C. and which are at least partially cured. These arylene sulfide polymers can have a melting temperature anywhere in the range from about 200° C. to about 500° C. Polymers of phenylene sulfide normally have melting temperatures in the range from about 290° to about 480° C. The preferred polymers have an inherent viscosity in chloronaphthalene at 206° C. of at least 0.1, preferably between 0.1 and 0.3, and ideally between 0.13 and 0.23.

The present invention is broadly applicable to the treatment of a poly(arylene sulfide) surface, such as a molded article, film, fiber, or other form, with a strong oxidizing agent such as an alkali metal or alkaline earth metal hypohalite followed by step-wise heat treatment at increased temperatures in each successive step at temperatures below the melting point of the polymer.

The strong oxidizidng agent such as an alkali metal or alkaline earth metal hypohalite can be employed at a concentration ranging from about 0.5 weight percent to saturated in water solutions, preferably at a concentration of from about 1 to about 20 weight percent. The presently preferred hypohalite is sodium hypochlorite. Representative examples of or oxidizing agents that can be used include sodium hypofluorite, sodium hypobromite, sodium hypoiodite, potassium hypochlorite, cesium hypochlorite, magnesium hypochlorite, calcium hypochlorite, and the like, and mixtures thereof.

The conditions under which the process of the present invention are carried out will vary according to the treating fluid used and the desired results. The level or nature of the result is dependent upon the severity of the treatment. The level of treatment severity depends upon the combination of operating parameters used in the process; namely, the concentration of the treating agent in the treating fluid, the time of treatment and the temperature of treatment. In any event, the conditions employed are such as to form an arylene sulfide polymer article exhibiting improved physical and chemical properties and extend the limits of usage of the treated article to higher temperatures.

Generally, the treatment time will range from about 0.25 to about 5 hours, preferably from about 0.5 to about 2 hours. The treatment temperature will ordinarily range from about 50° C. (122° F.) to about 100° C. (212° F.) preferably from about 70° C. (158° F.) to about 90° C. (194° F). Ordinarily, pressures in the range of 0 to 25 psig are used. Operation at atmospheric pressure is convenient.

Contacting of the oxidizing fluid with the poly(arylene sulfide) resin can be carried out in any suitable manner, such as immersion in a liquid phase, spraying with agent, dipping article in oxidizing agent, or other means using any suitable apparatus. The process can be carried out batch-wise or in continuous fashion.

After sufficient contact of the resin with the treating fluid, i.e., oxidizing agent, the treating fluid is removed by any suitable separation procedure. For example, the liquid treating agent can be separated from the solid resin by filtration, centrifuging, decantation, etc. If desired, the resin can be washed with a suitable wash liquid followed by drying.

Following treatment of the resin with alkali metal hypochlorite, for example, the resin is then subjected to step-wise heat treatment under conditions and for a period of time sufficient to improve the physical and chemical properties of the molded polymer.

The heat treatment can be carried out in plural stages with each subsequent stage being at a higher temperature. It is preferable to gradually increase the temperature from one stage to the next over a finite period of time and then holding the temperature at a plateau for a longer period of time until it is desired to increase the temperature to the next stage.

In a preferred embodiment, the molded arylene sulfide polymer is heated in a step-wise fashion from about 475° F. (246° C.) to about 550° F. (287° C.) in three stages. The heating time at the different stages can vary substantially but ordinarily will be approximately 24 hours per stage. In changing the heating to the next higher temperature stage, ordinarily the temperature will be increased at the rate of about 10° per hour. In any event, the final temperature at the last heating stage will be somewhat below the melting point of the polymer, preferably at least about 25° F. below the melting point.

The heating, according to the invention, can be carried out in conventional equipment. The heating can be carried out under atmospheric conditions or in the presence of an inert gas.

The polymers of this invention have utility in any application where high melting point and/or high temperature stability is desired. The polymers can be blended with fillers, pigments, stabilizers, accelerators, softeners, extenders, and other polymers. Such fillers as graphite, carbon black, titania, glass fibers, metal powders, magnesia, asbestos, clays, wood flour, cotton floc, mica, and the like, can be employed.

The following examples are intended to illustrate the process of the invention.

EXAMPLE I

This example describes the procedure used to prepare and evaluate test specimens. A polyphenylene sulfide composition available from Phillips Petroleum Company under the tradename of Ryton, Type R-4, comprised essentially of 60 wt. % polyphenylene sulfide polymer (melt flow 120±20 g/10 mins.) and 40% 0.125 in. fiber glass was extruded through a Davis Standard extruder at 600° F, (316° C.), dried in a 350° F. (177° C.) oven for 3 hours and molded using a New Britain molding machine (barrel 600° F., mold 275° F.) into either dogbone specimens 4.5 in.×0.25 in.×0.0625 in. for tensile strength tests made in accordance with ASTM Test Method D638 or bar specimens 5 in.×0.5 in.×0.125 in., for flexural strength tests made in accordance with ASTM Test Method D790, or izod impact strength tests in accordance with ASTM Test Method D256. The procedure was repeated with other polyphenylene sulfide compositions, namely Ryton R-8 (45% PPS, 20% glass fibers, 35% fillers and processing aids) and Ryton R-10 (35% PPS, 35% glass fibers, 30% fillers, pigments and processing aids, thus, the following typical performance properties were obtained.

|  | R-4 | R-8 | R-10 |
| --- | --- | --- | --- |
| Tensile Strength, MPa | 111 | 66.3 | 89.2 |
| Flexural Strength, MPa | 160.6 | 177.5 | 153.9 |
| Impact, J/M, Notched | 93.1 | 43.1 | 77.5 |
| Unnotched | 309 | 84.1 | 193 |

EXAMPLE II

This example describes the inventive procedures used to subsequently treat test specimens prepared according to Example I. Specimens to be heat treated were placed in a forced draft oven and heated as follows: 475° F. (246° C.) for 24 hrs., increased 10° F. per hr. to 525° F. (274° C.) and held at 525° F. for 19 hrs., again increased 10° F. per hr. to 550° F. (288° C.) and held at 550° F. for 21.5 hrs. After cooling the heated specimens to ambient room temperature and storing at room temperature overnight, the specimens were tested at about 25° C. as previously described.

Specimens to be treated with aqueous alkali metal hypohalite were handled as follows: total immersing in 5 to 6 wt. % aqueous sodium hypochlorite (Clorox) for 1 hr. at 176° F. (80° C.), removed from the solution, dried at 300° F. (149° C.), cooled and tested in a manner as previously described. Each series of tests on treated samples was accompanied by additional testing on untreated samples for a more direct comparison. The effects of these treatments on performance properties can be seen in Table 1 where it is shown that either of the two surface treatments generally enhances properties. The greatest enhancement is realized when polyphenylene sulfide compositions are treated by both methods, namely, first treatment with aqueous alkali metal hypohalite followed by a heat treatment, both methods previously described.

| PPS Composition | Treatment | % Change in Performance Properties After Treatment(s)[a] | | | |
| --- | --- | --- | --- | --- | --- |
| | | Tensile Strength | Flexural Strength | Notched Izod | Unnotched Izod |
| R-4 | Heat | +14.9 | +9.4 | +43.3 | +109.4 |
| | Aq. | +10.0 | −1.8 | −3.0 | −19.9 |

| PPS Composition | Treatment | % Change in Performance Properties After Treatment(s)[a] | | | |
|---|---|---|---|---|---|
| | | Tensile Strength | Flexural Strength | Notched Izod | Unnotched Izod |
| R-8 | NaOCl Aq. | | | | |
| | NaOCl + Heat | +27.8 | +20.1 | +42.5 | +103.1 |
| | Heat | +42.8 | +10.1 | +9.2 | +38.7 |
| | Aq. | +39.8 | −33.0 | −3.4 | +3.2 |
| | NaOCl + Heat | +60.1 | +9.8 | +1.7 | +29.6 |
| R-10 | Heat | +24.9 | +0.74 | −0.32 | +50.5 |
| | Aq. | +18.0 | −6.2 | −1.1 | +1.4 |
| | NaOCl Aq. | | | | |
| | NaOCl + Heat | +51.9 | +33.6 | +16.4 | +118.5 |

[a] Separate untreated specimen values obtained for each treatment.

We claim:

1. A process for improving the physical and chemical properties of arylene sulfide polymers which comprises
   (a) contacting a surface of a molded form of said polymer with an alkali metal or alkaline earth metal hypohalite and
   (b) subjecting the polymer of (a) to heat treatment at a temperature below the melting point of the polymer in plural stages of increasing temperatures with the initial stage being carried out at about 475° F. and heating at each stage being maintained for a period of time sufficient to improve the flexural and tensile properties of the molded polymer and extend the limits of its usage to higher temperatures.

2. A process according to claim 1 wherein said hypohalite is sodium hypochlorite.

3. A process according to claim 1 wherein the conditions in step (a) include a temperature in the range of 50° C. (122° F.) to 100° C. (212° F.), pressure in the range of 0 to 25 psig, and a period of contacting ranging from about 0.25 hours to about 5 hours.

4. A process according to claim 1 wherein the conditions in step (b) include a temperature ranging from about 475° F. to about 550° F. and wherein the temperature at each stage is maintained for a period of time of about 24 hours.

5. A process according to claim 1 wherein said arylene sulfide polymer is fiberglass-filled poly(phenylene sulfide).

6. A process according to claim 1 wherein said hypohalite is sodium hypochlorite and the conditions in step (a) include a temperature in the range of 70° C. (158° F.) to 90° C. (194° F.), a pressure in the range of 0 to 25 psig, and a period of contacting ranging from 0.5 hours to 2 hours, and the conditions in step (b) include a temperature in the range of about 475° F. to about 550° F. and the length of time at each stage is about 24 hours.

7. A process according to claim 6 wherein said arylene sulfide polymer is fiberglass-filled poly(phenylene sulfide).

8. A process according to claim 6 wherein the temperature is increased between each stage at a rate of about 10° per hour and wherein there are three heating stages and the heating at each stage is carried out for a period of about 24 hours.

9. A process according to claim 8 wherein the first stage of heating is carried out at a temperature of about 475° F., the second stage at about 525° F., and the third stage at about 550° F.

* * * * *